(12) United States Patent
Kishi et al.

(10) Patent No.: US 11,238,107 B2
(45) Date of Patent: Feb. 1, 2022

(54) MIGRATING DATA FILES TO MAGNETIC TAPE ACCORDING TO A QUERY HAVING ONE OR MORE PREDEFINED CRITERION AND ONE OR MORE QUERY EXPANSION PROFILES

(71) Applicant: International Business Machines Corporation, Armonk, NY (US)

(72) Inventors: Gregory Kishi, Oro Valley, AZ (US); Joseph Dain, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 16/735,263

(22) Filed: Jan. 6, 2020

(65) Prior Publication Data
US 2021/0209165 A1   Jul. 8, 2021

(51) Int. Cl.
*G06F 16/00* (2019.01)
*G06F 16/9035* (2019.01)
(Continued)

(52) U.S. Cl.
CPC ........ *G06F 16/9035* (2019.01); *G06F 3/0613* (2013.01); *G06F 3/0682* (2013.01);
(Continued)

(58) Field of Classification Search
None
See application file for complete search history.

(56) References Cited

U.S. PATENT DOCUMENTS 6,330,572 B1 * 12/2001 Sitka ............... G06F 16/122
707/608
6,393,516 B2    5/2002 Johnson
(Continued)

FOREIGN PATENT DOCUMENTS

EP        992913 A1    4/2000

OTHER PUBLICATIONS

Lindsey, M. R., "Evolution of the File Metaphor," Presented in Advanced Operating System (Comp 242), May 6, 2002, pp. 1-8, retrieved from https://pdfs.semanticscholar.org/7738/b45d65eeae98e9849e61eef66b24965cc735.pdf.

*Primary Examiner* — Polina G Peach
(74) *Attorney, Agent, or Firm* — Zilka-Kotab, P.C.

(57) ABSTRACT

A computer-implemented method according to one embodiment includes performing a query for finding files that meet at least one predefined criterion. The at least one predefined criterion includes a file size that is less than a predefined fraction of a predetermined threshold file size. Performing the query includes sequentially performing additional querying in response to finding a first file that meets the at least one predefined criterion. As files are found in the additional querying, for each sequence of additional querying, the method includes determining whether a total storage size of files found during performance of the query exceeds the predetermined threshold file size. In response to a determination that the total storage size of the files found during performance of the query exceeds the predetermined threshold file size, the files are consolidated into a consolidation file. The method further includes writing the consolidation file to a magnetic recording tape.

20 Claims, 5 Drawing Sheets

(continued)

(51) Int. Cl.
    *G06F 16/907*     (2019.01)
    *G06F 3/06*     (2006.01)
    *G06F 16/9038*     (2019.01)
    *G06F 16/30*     (2019.01)

(52) U.S. Cl.
    CPC ........ *G06F 16/907* (2019.01); *G06F 16/9038* (2019.01); *G06F 3/0658* (2013.01)

(56) References Cited

U.S. PATENT DOCUMENTS

| | | | |
|---|---|---|---|
| 7,590,664 B2 | 9/2009 | Kamohara et al. | |
| 7,793,066 B2 | 9/2010 | Saliba | |
| 7,953,949 B2 * | 5/2011 | Arakawa | G06F 3/0608 711/165 |
| 8,656,097 B2 * | 2/2014 | Lee | G06F 3/0656 711/113 |
| 10,235,086 B1 | 3/2019 | McCloskey et al. | |
| 2002/0030853 A1 * | 3/2002 | Kizaki | H04N 1/33376 358/1.16 |
| 2003/0037019 A1 * | 2/2003 | Nakamura | G06F 3/0689 |
| 2003/0147361 A1 * | 8/2003 | Tsukidate | H04H 60/73 370/316 |
| 2006/0106782 A1 * | 5/2006 | Blumenau | G06Q 10/06 |
| 2008/0154840 A1 | 6/2008 | Rathi et al. | |
| 2010/0287166 A1 * | 11/2010 | Yang | G06F 16/285 707/741 |
| 2013/0218916 A1 * | 8/2013 | Suzuki | G06F 16/11 707/755 |
| 2014/0111881 A1 * | 4/2014 | Zhao | G06F 3/0608 360/49 |
| 2015/0106409 A1 * | 4/2015 | Yamamoto | G06F 16/152 707/821 |
| 2015/0293699 A1 | 10/2015 | Bromley et al. | |
| 2016/0004601 A1 | 1/2016 | Ahn et al. | |
| 2017/0235756 A1 | 8/2017 | Mehta et al. | |
| 2017/0270184 A1 * | 9/2017 | Huang | G06F 16/2228 |
| 2018/0018124 A1 * | 1/2018 | Kudo | G06F 3/0685 |
| 2018/0088870 A1 * | 3/2018 | Lv | G06F 16/185 |
| 2019/0018844 A1 | 1/2019 | Bhagwat et al. | |
| 2020/0019535 A1 * | 1/2020 | Parker | G06F 16/122 |
| 2020/0073574 A1 * | 3/2020 | Pradhan | G06F 3/067 |

* cited by examiner

MIGRATING DATA FILES TO MAGNETIC TAPE ACCORDING TO A QUERY HAVING ONE OR MORE PREDEFINED CRITERION AND ONE OR MORE QUERY EXPANSION PROFILES

BACKGROUND

The present invention relates to data storage, and more specifically, this invention relates to migrating data files to magnetic tape according to a query having one or more predefined criterion and one or more query expansion profiles.

Data stored in a data storage environment is often partitioned and stored as data files in a file system. During a period in which data is stored in data files, the data may be accessed and sometimes modified, e.g., added to, reduced, copied, deleted, etc. Moreover, the physical and/or logical storage locations of such data of may also be changed to enable faster access to the data. For example, data and/or a copy of data that is accessed relatively frequently is often at least temporarily stored in "higher" storage tiers of a tiered storage system, where the higher storage tiers have relatively lower read and/or write latencies. In contrast, data that is accessed relatively less frequently and/or a copy of such data is often stored in "lower" storage tiers.

SUMMARY

A computer-implemented method according to one embodiment includes performing a query for finding files that meet at least one predefined criterion. The at least one predefined criterion includes a file size that is less than a predefined fraction of a predetermined threshold file size. Performing the query includes sequentially performing additional querying in response to finding a first file that meets the at least one predefined criterion. Each sequence of additional querying incorporates a different predefined query expansion profile for finding additional files that meet the at least one predefined criterion. As files are found in the additional querying, for each sequence of additional querying, the method further includes determining whether a total storage size of files found during performance of the query exceeds the predetermined threshold file size. In response to a determination that the total storage size of the files found during performance of the query exceeds the predetermined threshold file size, the files are consolidated into a consolidation file. The method further includes writing the consolidation file to a magnetic recording tape.

A computer program product for migrating data files to magnetic tape according to a query having one or more predefined criterion and one or more query expansion profiles according to one embodiment includes a computer readable storage medium having program instructions embodied therewith. The program instructions are readable and/or executable by a controller to cause the controller to perform the foregoing method.

A system according to one embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
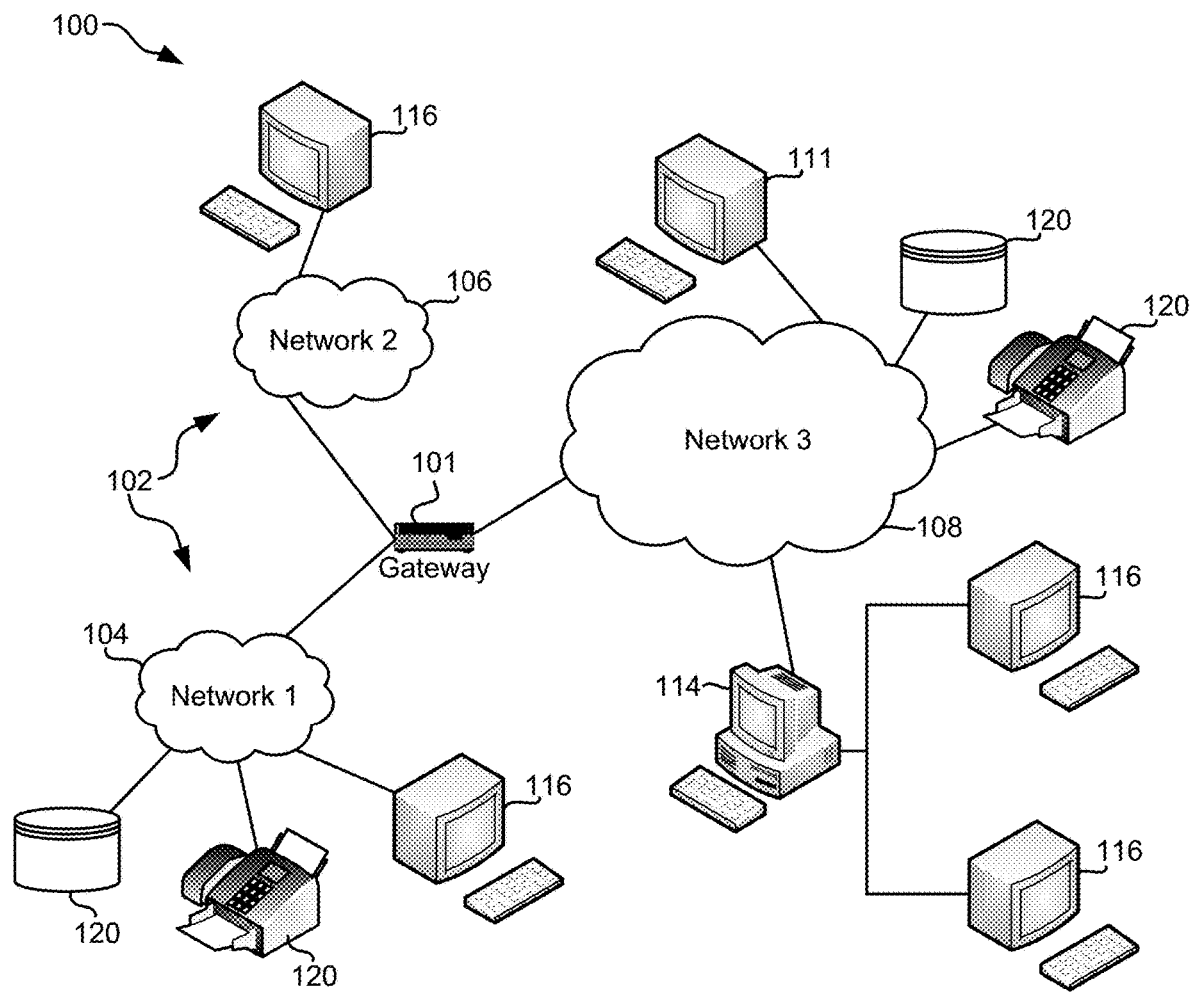
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for migrating data files to magnetic tape according to a query having one or more predefined criterion and one or more query expansion profiles.

In one general embodiment, a computer-implemented method includes performing a query for finding files that meet at least one predefined criterion. The at least one predefined criterion includes a file size that is less than a predefined fraction of a predetermined threshold file size. Performing the query includes sequentially performing additional querying in response to finding a first file that meets the at least one predefined criterion. Each sequence of additional querying incorporates a different predefined query expansion profile for finding additional files that meet the at least one predefined criterion. As files are found in the additional querying, for each sequence of additional querying, the method further includes determining whether a total storage size of files found during performance of the query exceeds the predetermined threshold file size. In response to a determination that the total storage size of the files found during performance of the query exceeds the predetermined threshold file size, the files are consolidated into a consolidation file. The method further includes writing the consolidation file to a magnetic recording tape.

In another general embodiment, a computer program product for migrating data files to magnetic tape according to a query having one or more predefined criterion and one or more query expansion profiles includes a computer readable storage medium having program instructions embodied therewith. The program instructions are readable and/or executable by a controller to cause the controller to perform the foregoing method.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
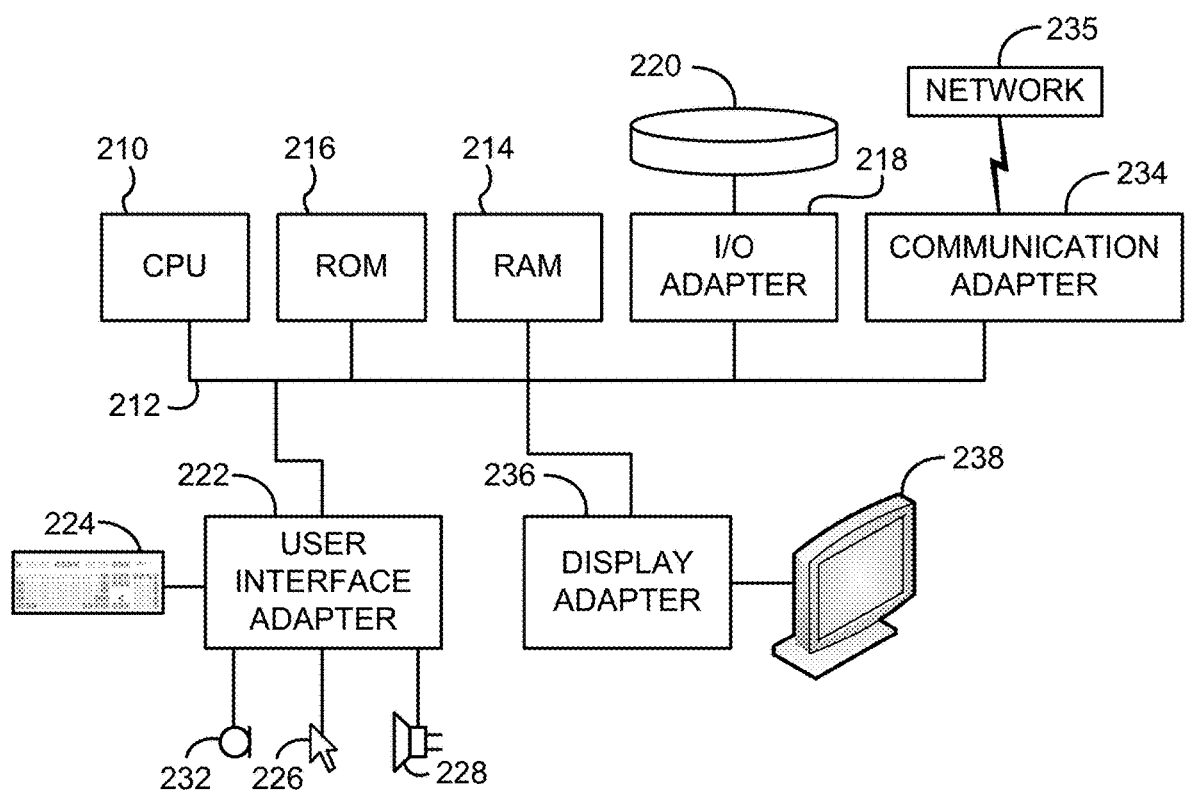
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
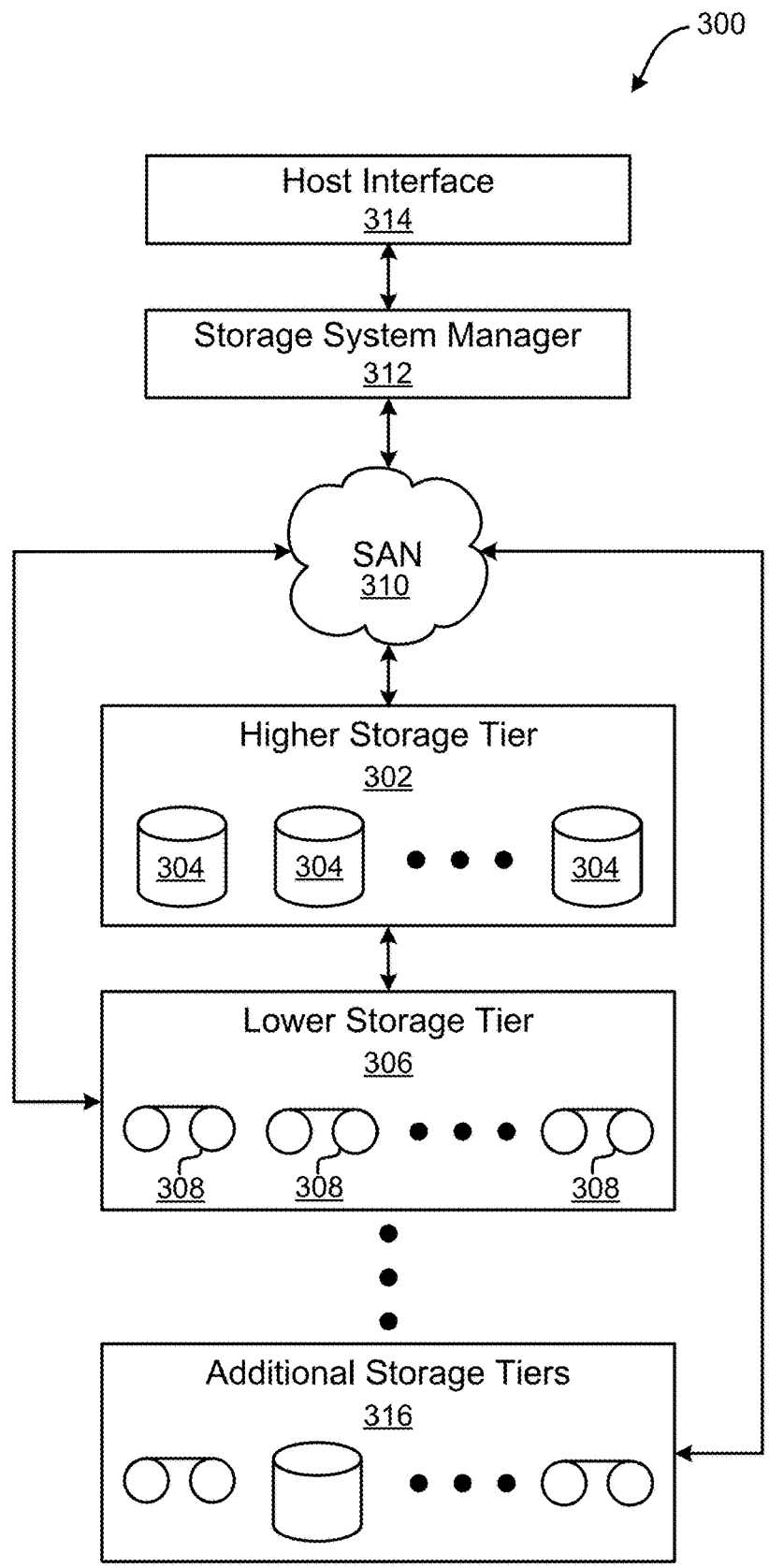
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned elsewhere above, data stored in a data storage environment is often partitioned and stored as data files in a file system. During a period in which data is stored in data files, the data may be accessed, modified, moved, etc. Data in a tiered data storage system is typically migrated to different tiers based on predefined criteria.

In some tiered data storage systems, data files may be retained exclusively on HDDs, SSDs, and other expensive but fast storage. However, such a storage system is often expensive to maintain, especially as a total storage size of the system increases. Accordingly, magnetic recording tape is a cost-effective type of data storage as it is estimated to be less than half the cost of hard disk storage.

However, transitioning data to magnetic recording tape may cause latency, e.g., reduced I/O rates, in a data storage system. The amount of latency tends to be higher as file sizes decrease, as the efficiency of migrating small files to tape is very poor. For example, each transitional write operation may involve starting and subsequently stopping the magnetic tape, thereby undesirably introducing latency into the process of transitioning the data to magnetic recording tape.

Various embodiments and approaches described herein include writing a consolidated file to a magnetic recording tape as a cost-effective strategy for long-term storage of data files included in the consolidated file. Various ones of such embodiments and approaches incorporate at least one predefined criterion and/or one or more predefined query expansion profiles in generating the consolidated file, for enabling particularization of the type and size of data files that make up the consolidated file.

Figure 4:
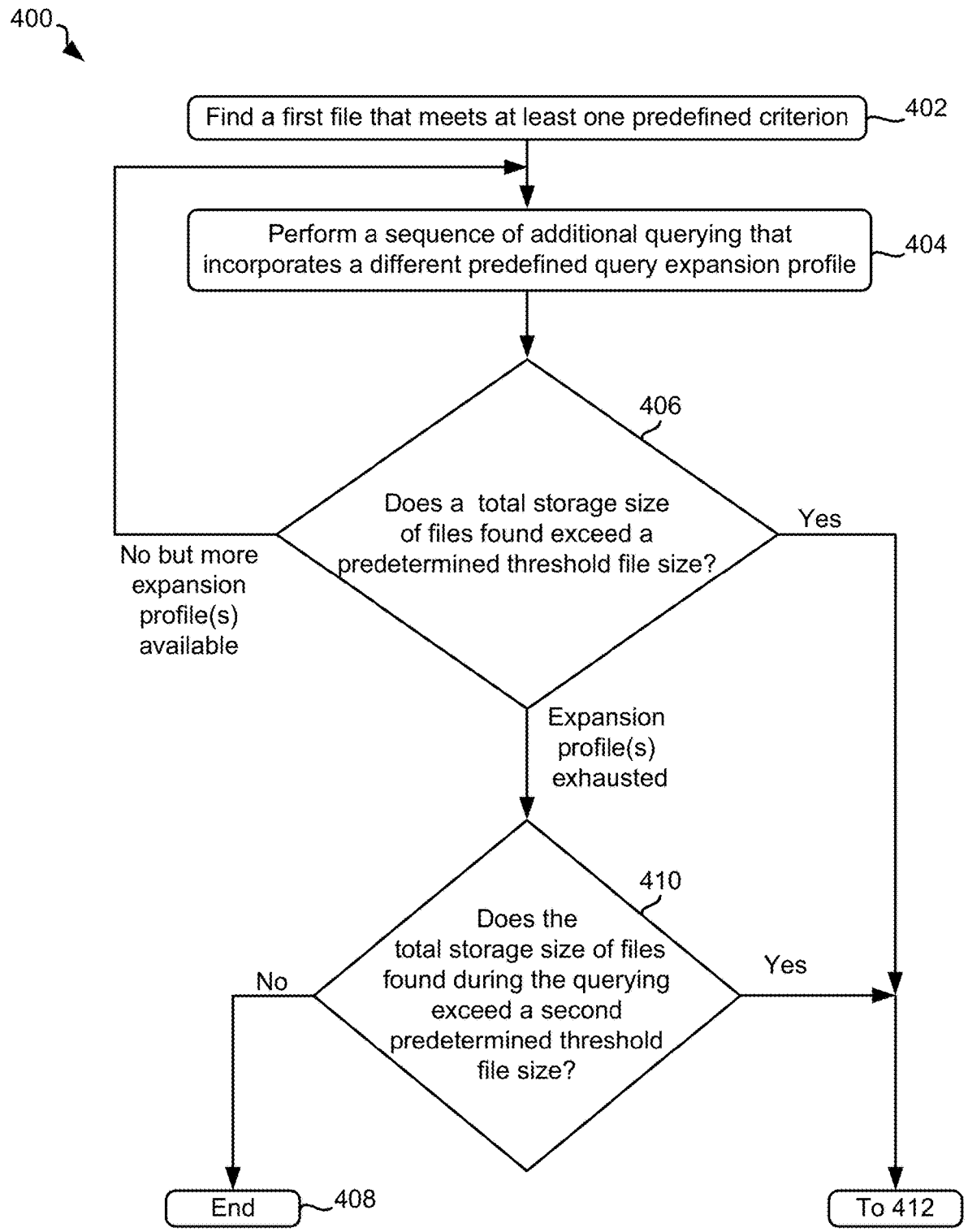
FIG. 4 is a flowchart of a method, in accordance with one embodiment.
Figure 4:
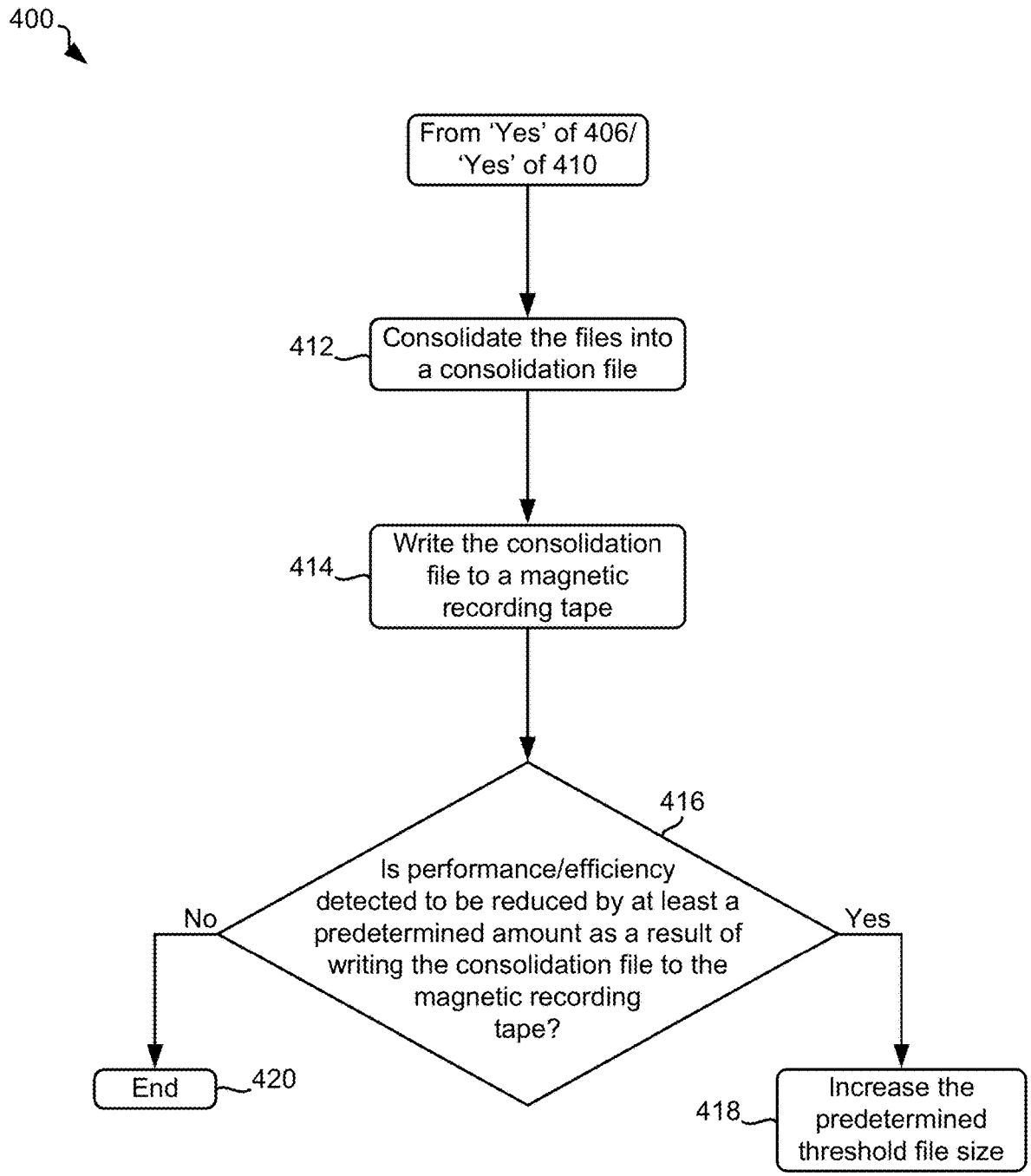

Now referring to FIG. 4, a flowchart of a method 400 is shown according to one embodiment. The method 400 may be performed in accordance with the present invention in any of the environments depicted in FIGS. 1-3, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Method 400 includes performing a query. In the current embodiment, the query is performed on a known type of file system, e.g., a virtual file system, although in one or more other embodiments, the query may be performed on any particular type of data storage system.

According to a specific approach, the file system on which the query is performed may be compatible with and/or utilize, e.g., be monitored by, an implementation of Spectrum Discover by IBM® (which may be purchased from IBM North America, 590 Madison Avenue, New York, N.Y. 10022, United States). More specifically, the target system on which the query may be performed may be SPECTRUM® Archive by IBM® (which may be purchased from IBM North America, 590 Madison Avenue, New York, N.Y. 10022, United States), however, depending on the approach one or more other systems managed by Spectrum Discover may be used.

A query is performed for finding files that meet at least one predefined criterion. For example, with continued reference to FIG. 4, operation 402 includes finding a first file that meets the at least one predefined criterion.

The at least one predefined criterion may include any known type of criterion. One illustrative predefined criterion includes a file having a file size that is less than or equal to a predefined fraction of a predetermined threshold file size. In some preferred approaches, the predetermined threshold file size, e.g., "S," may be a file size that is known to be efficient to move, e.g., transition from disk or some other type of memory to magnetic recording tape using a write operation. The predetermined file size may be known to be efficient to move based on at least some previous write operations. As will be described elsewhere herein, in some approaches, in order to ensure that such transitional write operations are practical, only files that are in a size range, e.g., less than or equal to size "F," may be tarred, where F is equal to a fraction of file size S. Note that the term "practical" may depend on the approach. For example, in some approaches the write operations may be practical because holding files larger than the file size F may interfere with migration due to the relatively larger size of such files, whereas files having a file size that is smaller than F do not take up much space on the higher tier but require more I/O operations per unit of data than larger files, and therefore are inefficient for individually writing out to magnetic recording tape. Accordingly, in order to avoid the inefficiency of such individual writes, these files having a file size that is smaller than F are preferably consolidated in a "tar" file (consolidation file) in a "tarring" operation (consolidation operation) once a total size of the smaller files found during querying exceeds S. As mentioned elsewhere above, S is a size that is known to be efficient for writing to magnetic recording tape (e.g., causing minimal resulting latency).

The fraction may include any numerator and/or denominator resulting in a fraction that is less than 1. According to some illustrative approaches, the predefined criterion may include a file having a file size that is less than or equal to, e.g., one fifth, one tenth, one fifteenth, etc., of the threshold file size.

The predetermined threshold file size may be assigned, preprogrammed, downloaded, selected by a user, etc. In some approaches, the threshold file size may be determined based on one or more factors, as will be described below in one or more approaches.

According to some approaches, the predetermined threshold file size may be based on previously measured performance metric(s) of a file system on which the query is being performed and/or a data system that includes the file system, for ensuring that any files and/or consolidation of files that are written to magnetic recording tape, are not of a size that is likely to cause a relatively extensive degree of diminished performance within the file system/data storage system, during such write operations. For example, as mentioned elsewhere above, in some approaches, the predetermined threshold file size may be determined based on a previous write operation to a magnetic recording tape. According to a more specific approach, the write operation used to determine the predetermined threshold file size may be one that was previously determined to result in at least a predetermined amount of reduction in performance of the file system. In such an approach, the predetermined threshold file size ultimately used as the predetermined threshold file size may be adjusted away from the threshold size that resulted in at least the predetermined amount of reduction in system performance. According to another specific approach, the predetermined threshold size may be set to a threshold size that has previously been utilized for preparing a write operation that did not result in at least a predetermined amount of reduction in I/O rates within the file system and/or data system. According to yet another specific approach, the predetermined threshold size may be set to a threshold file size that is less than a threshold file size that previously resulted in a write operation having a write time that was longer than a maximum allowed write time, where the maximum allowed write time may be set by e.g., an administrator of the file system, system default constrains/parameters, a user of the file system, etc.

According to another example, the predetermined threshold file size may be predetermined based on an estimation. For example, where no previous write operations are available for basing the predetermined threshold file size on, the predetermined threshold file size may be estimated, e.g., based on a random guess, based on known advice, etc.

The predefined criterion may additionally and/or alternatively incorporate an access history of a file. For example, in some illustrative approaches the at least one predefined criterion may include, e.g., a file having not been accessed for at least a predetermined amount of time, a file having at least a predetermined threshold of access frequency, a file having been accessed or alternatively having not been accessed by one or more particular users, etc. The incorporation of an access history of a file into the at least one predefined criterion may enable a cost-effective storage practice as a result of files having a relatively inactive access history being found in the query as files for transitioning from relatively more expensive storage types (such as disk) to relatively less expensive storage types (such as magnetic recording tape).

In some approaches, performing the query may include sequentially performing additional querying in response to finding a first file that meets the at least one predefined criterion. For context, because in some approaches the predefined criterion of the query includes a file having a file size that is less than or equal to a selected fraction of a predetermined threshold file size, upon finding the first file, e.g., see operation 402, only the fraction of the predetermined threshold file size is met. Accordingly, in the current approach, additional querying sequences are performed in order to accumulate several files that collectively have a total storage size that is about the predetermined threshold file size, e.g., see operation 404.

In some approaches each sequence of additional querying may incorporate a different predefined query expansion profile for finding additional files that meet the at least one predefined criterion. Depending on the settings of the query, each of the expansion profiles of the additional sequences of querying may include at least one unique predefined criterion. Moreover, in some approaches, one or more of the sequences may additionally apply any of the previously applied predefined criterion. Performing additional querying according to sequences may limit the extent of files that are considered in the sequential process of accumulating files that meet the at least one predefined criterion. This, as a result, limits the file system resources that are expended in performing at least the query operations of method 400. It should be noted however, that this limiting of the expenditure of storage system resources is optional/adjustable in some embodiments, where an extent of predefined criterion included in the additional sequences of querying may be selectively adjusted in one or more approaches, e.g., adjusted by a user, adjusted by an administrator, adjusted based on a size of the file system (such as adjusted to include relatively more predefined criterion for relatively larger file systems and relatively less predefined criterion for relatively smaller file systems). Accordingly, depending on the approach, each sequence of the additional querying may incorporate any one or more predefined criterion, e.g., a predefined criterion that was already used in the query operation and/or a predefined criterion that was not already used in the query operation. Various non-limiting examples of additional predefined criterion that may be included in one or more predefined query expansion profiles of one or more sequences of additional querying will now be described below.

In some approaches, an additional predefined criterion of a predefined query expansion profile may include the additional files having a logical association with the first file. An extent and/or configuration of such logical association may depend on the approach. For example, according to a more specific approach, the logical association may include at least some of the additional files having access permissions granted to a predetermined group of users that have access to the first file, e.g., such as users that are working on a project together and/or working within the same department. The logical association may in some approaches ensure that at least one sequence of additional querying focuses on files that are specific to a particular group of users. This may be particularly useful in clustered file systems in which files of the file system are concurrently accessed by a predetermined group of users.

According to another specific approach, the logical association may include at least some of the additional files having access permissions granted to only a single user, e.g., an owner of the first file, a current owner of the first file, a user that currently has a credential to modify the first file, etc. In one example, having an expansion profile that specifies such a logical association may allow a user to volunteer his or her own files for consideration in the query. According to an alternative example, having an expansion profile that specifies such a logical association may enable an administrator of a file system to specify files for consideration in the query according to user permissions. This may be particularly useful in various file systems where, e.g., a user is willing/volunteers to have his or her files moved to magnetic recording tape, an administrator knows/indicates that for an extended period of time a given user will not access any of the files that the given user has permission to access, files of all other users of the file system are not allowed to be transitioned to magnetic recording tape, etc.

According to some other approaches, the logical association may additionally and/or alternatively include at least some of the additional files having logical addresses having a predetermined degree of commonality with the logical address of the first file, e.g., associated based on a predetermined structural parameter of the file system. For example, in one approach, the logical association may include at least some of the additional files having a logical address having a sub-directory that has a predetermined degree of commonality with a sub-directory of the logical address of the first file. According to another illustrative example, the logical association may include at least some of the additional files having a logical pointer that points to a common portion of the file system as another logical pointer that points from the first file.

One or more sequences of the additional querying may in some approaches incorporate a predefined expansion profile for finding one or more additional files having contents that include a predetermined topic. Accordingly, in some approaches, performing the query may include parsing contents of the additional files, e.g., parsing such contents for predetermined keywords and thereafter optionally setting tags based on results of such searching. In some other approaches, performing the query may additionally and/or alternatively include accessing the parsed contents of one or more of the additional files, e.g., based on a previous parsing of the contents of the additional files. In one or more of such approaches, the predetermined topics for the additional files may be determined by using one or more known techniques for parsing the contents of a file.

According to some other approaches, a sequence of the additional querying may additionally and/or alternatively incorporate a predefined expansion profile for finding additional files having metadata tags with at least a predefined extent of similarity with the first file. Depending on the approach, the similarity may be based on any one or more known types of comparable characteristics of a metadata tag. For example, according to various approaches, such characteristics may include, e.g., a name of an author and/or creator of the associated file, descriptive characteristics of attributes of the associated file, a date that the associated file was created, a date that the associated file was last modified, etc. In one or more of such approaches, the metadata tags may be stored in a database in which each of the metadata tags are associated, e.g., based on a preassociation, with a respective one of the additional files.

The query expansion profiles may in some approaches be specific to different users. For example, in one approach, method 400 may include loading/queuing one or more query expansion profiles that are associated with a user in response to receiving authenticating information of the associated user, e.g., user credentials, a username, a password, etc. In some approaches, the query expansion profiles that are specific to different users may be amendable, e.g., by a user, by an administrator, according to known user preferences, etc.

As files are found in the additional querying, in some approaches, for each sequence of additional querying, it may be determined whether a total storage size of files found during performance of the query (when concatenated together) exceeds the predetermined threshold file size, e.g., see decision 406. In one preferred approach, the total storage size of files found during performance of the query is evaluated following each sequence of additional querying and includes a size of the first file and any files found in any performed sequences of additional querying. For example, subsequent finding the first file that meets the at least one predefined criterion (see operation 402) and finding two additional files subsequent performing a first sequence of additional querying (see operation 404), the total storage size of files found during performance of the query is the sum of the size of the first file and the sizes of the two files found during the first sequence of additional querying.

In some approaches, the additional querying is performed until the total storage size of files found during performance of the query exceeds a predetermined threshold, e.g., see decision 406. Equivalently, in another approach, the additional querying is performed until the total storage size of files found during performance of the query is within a predetermined range from the predetermined threshold. The total storage size of files found during performance of the query may preferably be as close to the predetermined threshold as possible. Accordingly, in one approach, in response to a determination that the total storage size of the files is greater than the predefined threshold, a file may be removed from the files found in the querying, and thereafter the total storage size of the files may be reconsidered in view of the predefined threshold. In such an approach, the file that is removed may be, e.g., a file having the smallest relative size of the files found in the querying, a file having the largest relative size of the files found in the querying, one or more files having a total sum size that is about equal to the amount that the predetermined threshold is exceeded, etc.

In response to determining that a total storage size of files found subsequent a most previous sequence of additional querying does not exceed a predetermined threshold file size, provided that there are one or more predefined query expansion profile(s) that have not yet been utilized, another sequence of additional querying may be performed, e.g., as illustrated by the "No but more expansion profile(s) available" logical path of decision 406.

Based on a determination that the total storage size of the files found during performance of the query exceeds the predetermined threshold file size, e.g., as illustrated by the "Yes" logical path of decision 406, in some approaches, one or more operations may be performed to thereby generate a write operation for writing the files found in the query to a magnetic recording tape. In the current embodiment, generating a write operation may include consolidating the files into a consolidation file, e.g., see operation 412. Depending on the approach, the consolidation may be performed using one or more known techniques.

It should be noted that in some approaches, as files are determined to meet the at least one predefined criterion, method 400 may include optionally storing entries for the files in a list. Accordingly, in one or more of such approaches, performing the consolidation of files may include accessing a list of entries for determining which files to consolidate.

As noted above, once the total storage size of files found during the querying exceeds a predetermined threshold file size, the files are consolidated into a consolidation file in operation 412. Operation 414 of method 400 includes writing the consolidation file to a magnetic recording tape. In some approaches, the consolidated file may be written to the magnetic recording tape in response to any one or more operations being performed and/or detections being made. For example, according to various approaches, the consolidated file may be written to the magnetic recording tape in response to, e.g., determining that a tarring operation has been completed, a magnetic recording tape being mounted in a tape drive of the data storage system, determining that the consolidation file has been generated, etc. According to some other approaches, writing of the consolidation file may be postponed/scheduled for a predetermined time, e.g., scheduled downtime of the file system, a time immediately subsequent a determination that a predetermined amount of resources are available for the file system, a time specified by a user/administrator, etc.

Writing the consolidated file (which includes a plurality of files meeting the at least one predefined criterion) to the magnetic recording tape allows for relatively efficient data migration. This is because higher latency would result in the data file system/data storage system if the plurality of files of the consolidated file were otherwise written in separate write operations to magnetic recording tape. As described elsewhere herein, this is because each of such separate write operations may include time consuming operations such as starting and subsequently stopping the magnetic tape. Accordingly, various embodiments and approaches described herein improve overall performance and efficiency of data file systems/data storage systems, particularly in the context of data prioritization and migration.

Generating and/or performing a write operation of method 400 may, depending on the approach, additionally and/or alternatively include performing any one or more other optional operations. For example, in some approaches, method 400 may additionally and/or alternatively include performing a tarring operation on the files. The tarring operation may be verified, and a database may be tagged with the tar file path and location. Thereafter, in one approach, the original files may be deleted. For example, if determined to be safe, e.g., not capable of compromising data recovery measures, a known type of tar with a delete original mechanism may be utilized for performing the deletion. The tar file may then be migrated to the magnetic recording tape via a write operation.

It should be noted that in some approaches, a virtual file system shim may be used to find the consolidated files. In some approaches, an optimal location for such a shim may be a bottom of an implemented stack, e.g., an I/O stack utilized in the file system. In some other approaches, the shim may be placed at the top of the stack. In one approach, at the bottom of the stack, limited returns, e.g., such as "failed to find file," may be captured. In contrast, in one approach, on the top of the stack, all "open" requests may be received. For example, subsequent performing a consolidating of files found in a query, a request may be received for accessing one of the consolidated files. In order to fulfill the request, in one approach, the consolidated files may be disassembled. Depending on response times, in some approaches, the shim layer may either issue a "stat" command on the requested file for determining whether the file exists and upon determining the file does not exist, a database may be queried for finding the requested file. In another approach using the shim, an encoded stub file may be left in place of the file that was consolidated indicating the location of the consolidated file as an alternate to using a database. Alternatively, tags on the file in a metadata database such as Spectrum Discover may be examined and if the file is in a tar file, the tar file may be retrieved, and all the files may thereafter be restored from the tar file and the metadata database updated. Moreover, the tar file may be removed from the magnetic recording tape, e.g., due to the requested file being recently requested, and provided to the requesting user. However, it should be noted that in one preferred approach, any disassembling of the consolidated file is optionally concealed from the requesting user.

With continued reference to method 400, subsequent performing at least part of the writing of the consolidated file to the magnetic recording tape, in some approaches it may be considered whether the write operation causes performance/efficiency of the file system and/or a data storage system to be reduced. For example, decision 416 includes determining, e.g. based on a performed detection, whether performance/efficiency is reduced by at least a predetermined amount as a result of writing the consolidation file to the magnetic recording tape. In response to not detecting a reduction in performance/efficiency by at least the predetermined amount as a result of writing the consolidation file to the magnetic recording tape, in the current approach, the predetermined threshold file size may optionally not be changed, e.g., as illustrated by the "No" logical path of decision 416 continuing to "End" operation 420. In contrast, in some approaches, in response to detecting performance/efficiency is reduced by at least the predetermined amount as a result of writing the consolidation file to the magnetic recording tape, the predetermined threshold file size may be changed. For example, in one approach, in response to detecting such a reduction in performance/efficiency, the predetermined threshold file size may be increased, e.g., see operation 418.

According to another approach, in response to detecting such a change in performance/efficiency, a denominator of the fraction of the predetermined threshold file size may be increased or decreased. For example, decreasing the denominator of the predetermined fraction, e.g., from a fraction of $\frac{1}{5}$ to a fraction of $\frac{1}{3}$, may result in relatively larger, and thereby relatively fewer files, being selected for consolidation. In contrast, increasing the denominator of the fraction, e.g., from a fraction of $\frac{1}{3}$ to a fraction of $\frac{1}{5}$, may result in relatively smaller, and thereby relatively more files being selected for consolidation. In some approaches, changing the number of files that are consolidated and thereby written to the magnetic recording tape may offset some of the reduction in performance/efficiency that may be detected to result from the write operation.

Referring again to decision 406, in some approaches, subsequent to performing the query, it may be determined that the total storage size of files found during the querying does not exceed the predetermined threshold file size. In one approach, such a determination may be made upon determining that there are no remaining unutilized query expansion profiles e.g., as illustrated by the "Expansion profile(s)

exhausted" logical path of decision 406. As illustrated in decision 410 of method 400, in one or more of such approaches, it may be determined whether the total storage size of files found during the querying exceeds a second predetermined threshold file size, e.g., a minimum threshold. In some preferred approaches, the second predetermined threshold file size, e.g., "S2," may be a minimum file size that is known to be efficient to move, e.g., transition from disk or some other type of memory to magnetic recording tape using a write operation. The second predetermined file size may be known to be efficient to move based on at least some previous write operations. The determination of whether the total storage size of files found during the querying exceeds the second predetermined threshold file size may ensure that a potential writing of the files found in the query would not result in latencies that may otherwise be caused by performing write operations of data files having a relatively small size, e.g., a file size that is smaller than the second predetermined threshold file size. In the case that the total storage size of the files does not exceed the second predetermined threshold file size, it is likely that waiting a predetermined period of time, then re-evaluating the queries would result in the selection of more candidates.

In some approaches, in response to a determination that the total storage size of files found during the querying exceeds the second predetermined threshold file size, the consolidating and/or writing operations may be performed, e.g., as illustrated by the "Yes" logical path of decision 410 continuing to operation 412. However, in some approaches, in response to a determination that the total storage size of files found during the querying does not exceed the second predetermined threshold file size, the files may not, at least for some predetermined time, be written to the magnetic recording tape, e.g., see the "No" logical path of decision 410 continuing to "End" operation 408. In one approach, method 400 may optionally include optionally storing the results of the performed query, e.g., for reference/inclusion in a subsequently performed query. In another approach, in response to a determination that the total storage size of files found during the querying does not exceed the second predetermined threshold file size, a request for additional predefined criterion may be generated and/or output. Any additional predefined criterion that are received in reply to the output request may be applied in one or more additional sequences of additional querying that may be performed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
performing a query for finding files that meet at least one predefined criterion, wherein the at least one predefined criterion includes a file size that is less than a predefined fraction of a predetermined threshold file size,
wherein performing the query includes, in response to finding a first file that meets the at least one predefined criterion, sequentially performing additional querying, wherein each sequence of additional querying incorporates a different predefined query expansion profile for finding additional files that meet the at least one predefined criterion;
as files are found in the additional querying, for each sequence of additional querying, determining whether a total storage size of files found during performance of the query exceeds the predetermined threshold file size;
in response to a determination that the total storage size of the files found during performance of the query exceeds the predetermined threshold file size, consolidating the files into a consolidation file; and
writing the consolidation file to a magnetic recording tape.

2. The computer-implemented method of claim 1,
wherein a predefined query expansion profile of a sequence of additional querying includes an additional predefined criterion,
wherein the additional predefined criterion includes the additional files having a logical association with the first file,
wherein the logical association includes at least some of the additional files having access permissions granted to a predetermined group of users that have access to the first file.

3. The computer-implemented method of claim 1,
wherein a predefined query expansion profile of a sequence of additional querying includes an additional predefined criterion,
wherein the additional predefined criterion includes the additional files having a logical association with the first file,
wherein the logical association includes at least some of the additional files having access permissions granted to only an owner of the first file.

4. The computer-implemented method of claim 1,
wherein a predefined query expansion profile of a sequence of additional querying includes an additional predefined criterion,
wherein the additional predefined criterion includes the additional files having a logical association with the first file, wherein the logical association includes at least some of the additional files having logical addresses having a predetermined degree of commonality with the logical address of the first file.

5. The computer-implemented method of claim 1, wherein the predetermined threshold file size is based on previously measured performance metric(s) of a file system on which the query is being performed.

6. The computer-implemented method of claim 1, wherein a sequence of the additional querying incorporates a predefined expansion profile for finding one or more additional files having contents that include a predetermined topic, wherein predetermined topics for the additional files is determined by parsing contents of the additional files.

7. The computer-implemented method of claim 1, wherein a sequence of the additional querying incorporates a predefined expansion profile for finding additional files having metadata tags with at least a predefined extent of similarity with the first file, wherein the metadata tags of the additional files are stored in a database in which each of the metadata tags are associated with a respective one of the additional files.

8. The computer-implemented method of claim 1,
wherein the predetermined threshold file size is determined based on a previous write operation to a magnetic recording tape, and comprising:
detecting whether performance/efficiency is reduced by at least a predetermined amount as a result of writing the consolidation file to the magnetic recording tape; and
in response to detecting performance/efficiency is reduced by at least the predetermined amount as a result of writing the consolidation file to the magnetic recording tape, increasing the predetermined threshold file size.

9. The computer-implemented method of claim 1, comprising:
determining, subsequent to performing the query, that the total storage size of files found during the querying does not exceed the predetermined threshold file size;
determining whether the total storage size of files found during the querying exceeds a second predetermined threshold file size; and
in response to a determination that the total storage size of files found during the querying exceeds the second predetermined threshold file size, consolidating the files into a consolidation file, and
writing the consolidation file to a magnetic recording tape.

10. A computer program product for migrating data files to magnetic tape according to a query having one or more predefined criterion and one or more query expansion profiles, the computer program product comprising a computer readable storage medium having program instructions embodied therewith, the program instructions readable and/or executable by a controller to cause the controller to:
perform, by the controller, a query for finding files that meet at least one predefined criterion, wherein the at least one predefined criterion includes a file size that is less than a predefined fraction of a predetermined threshold file size,
wherein performing the query includes, in response to finding a first file that meets the at least one predefined criterion, sequentially performing additional querying, wherein each sequence of additional querying incorporates a different predefined query expansion profile for finding additional files that meet the at least one predefined criterion;
as files are found in the additional querying, for each sequence of additional querying, determine, by the controller, whether a total storage size of files found during performance of the query exceeds the predetermined threshold file size;
in response to a determination that the total storage size of the files found during performance of the query exceeds the predetermined threshold file size, consolidate, by the controller, the files into a consolidation file; and
write, by the controller, the consolidation file to a magnetic recording tape.

11. The computer program product of claim 10,
wherein a predefined query expansion profile of a sequence of additional querying includes an additional predefined criterion,
wherein the additional predefined criterion includes the additional files having a logical association with the first file,
wherein the logical association includes at least some of the additional files having access permissions granted to a predetermined group of users that have access to the first file.

12. The computer program product of claim 10,
wherein a predefined query expansion profile of a sequence of additional querying includes an additional predefined criterion,
wherein the additional predefined criterion includes the additional files having a logical association with the first file,
wherein the logical association includes at least some of the additional files having access permissions granted to only an owner of the first file.

13. The computer program product of claim 10,
wherein a predefined query expansion profile of a sequence of additional querying includes an additional predefined criterion,
wherein the additional predefined criterion includes the additional files having a logical association with the first file,
wherein the logical association includes at least some of the additional files having logical addresses having a predetermined degree of commonality with the logical address of the first file.

14. The computer program product of claim 10, wherein the predetermined threshold file size is based on previously measured performance metric(s) of a file system on which the query is being performed.

15. The computer program product of claim 10, wherein a sequence of the additional querying incorporates a predefined expansion profile for finding one or more additional files having contents that include a predetermined topic, wherein predetermined topics for the additional files is determined by parsing contents of the additional files.

16. The computer program product of claim 10, wherein a sequence of the additional querying incorporates a predefined expansion profile for finding additional files having metadata tags with at least a predefined extent of similarity with the first file, wherein the metadata tags of the additional files are stored in a database in which each of the metadata tags are associated with a respective one of the additional files.

17. The computer program product of claim 10,
wherein the predetermined threshold file size is determined based on a previous write operation to a magnetic recording tape,
wherein the program instructions are readable and/or executable by the controller to cause the controller to:
  detect, by the controller, whether performance/efficiency is reduced by at least a predetermined amount as a result of writing the consolidation file to the magnetic recording tape; and
  in response to detecting performance/efficiency is reduced by at least the predetermined amount as a result of writing the consolidation file to the magnetic recording tape, increase, by the controller, the predetermined threshold file size.

18. The computer program product of claim 10, the program instructions readable and/or executable by the controller to cause the controller to:
  determine, by the controller, subsequent to performing the query, that the total storage size of files found during the querying does not exceed the predetermined threshold file size;
  determine, by the controller, whether the total storage size of files found during the querying exceeds a second predetermined threshold file size; and
  in response to a determination that the total storage size of files found during the querying exceeds the second predetermined threshold file size, consolidate, by the controller, the files into a consolidation file, and
  write, by the controller, the consolidation file to a magnetic recording tape.

19. A system, comprising:
a processor; and
logic integrated with the processor, executable by the processor, or integrated with and executable by the processor, the logic being configured to:
  perform a query for finding files that meet at least one predefined criterion, wherein the at least one predefined criterion includes a file size that is less than a predefined fraction of a predetermined threshold file size,
  wherein performing the query includes, in response to finding a first file that meets the at least one predefined criterion, sequentially performing additional querying, wherein each sequence of additional querying incorporates a different predefined query expansion profile for finding additional files that meet the at least one predefined criterion;
  as files are found in the additional querying, for each sequence of additional querying, determining whether a total storage size of files found during performance of the query exceeds the predetermined threshold file size;
  in response to a determination that the total storage size of the files found during performance of the query exceeds the predetermined threshold file size, consolidating the files into a consolidation file; and
  writing the consolidation file to a magnetic recording tape.

20. The system of claim 19,
wherein a predefined query expansion profile of a sequence of additional querying includes an additional predefined criterion,
wherein the additional predefined criterion includes the additional files having a logical association with the first file,
wherein the logical association includes at least some of the additional files having access permissions granted to a predetermined group of users that have access to the first file.

\* \* \* \* \*